Sept. 27, 1932.                    H. TORRANCE                    1,880,117
                        APPARATUS FOR FREEZING COMESTIBLES
                               Filed Feb. 14, 1929

INVENTOR
Henry Torrance
BY
ATTORNEYS

Patented Sept. 27, 1932

1,880,117

UNITED STATES PATENT OFFICE

HENRY TORRANCE, OF NEW YORK, N. Y., ASSIGNOR TO THE CARBONDALE MACHINE CO., OF CARBONDALE, PENNSYLVANIA, A CORPORATION OF PENNSYLVANIA

APPARATUS FOR FREEZING COMESTIBLES

Application filed February 14, 1929. Serial No. 339,834.

This invention relates to the preservation of food products, by freezing, and is particularly applicable to fish fillets, although it may be used for meat, eggs, or other allied commodities which are or may be kept from deterioration, by freezing.

In carrying out my invention the products to be frozen are placed in comparatively shallow trays, pans or containers which are cooled by brine or other freezing liquids of the desired temperature.

As one important feature of my invention I float the food containers along a brine trough so that there is the most effective heat interchange between the cooled brine and the products to be frozen.

As a further important feature I provide a plurality of the brine troughs in superposed spaced relationship so that each food container is subjected to the cooling action of the brine trough above as well as by the cooling of the brine in the trough in which the container is floating.

As a further feature I provide a means for advancing the containers along the trough and removing them therefrom at the discharge end so that it is not necessary for the workman to enter the freezing chamber during the entire operation. The containers of material to be frozen may be delivered to the freezing chamber through openings in one wall, and after the freezing operation is completed, they may be delivered from the chamber through delivery openings.

As a further feature the brine troughs are arranged in spaced tiers so that between these tiers is provided storage space which will be kept at the desired low temperature by the indirect action of the cold brine used in the troughs for freezing.

My improved apparatus is inexpensive to build, efficient in operation, and may be so controlled that the products to be frozen will remain in the freezing chamber for any desired length of time depending upon the character of the products and the extent of the desired freezing.

In the accompanying drawing I have illustrated one embodiment of my invention.

In this drawing:

Fig. 1 is a horizontal section through an apparatus embodying the invention;

Fig. 2 is a transverse section on the line 2—2 of Fig. 1, but on a somewhat larger scale; and Fig. 3 is a vertical longitudinal section on the line 3—3 of Fig. 1, with the three lower troughs and part of the top trough shown in elevation, and a portion of the brine circulating system being shown diagrammatically.

In carrying out my invention I provide a freezing chamber of the desired size and capacity and having all of its walls made of proper heat insulating material. The freezing chamber may be made up of a plurality of units depending upon the size of the chamber and the desired capacity.

As shown the freezing chamber has two units each comprising a storage chamber 10 and two tiers of freezing troughs, one on each side. There are a plurality of these troughs 11 in spaced superposed relationship, the vertical distance between the troughs being such as will permit a series of pans or other containers 12 to float in the brine or other freezing liquid in the troughs and without rubbing contact of the articles in the pans with the bottom of the trough above. The troughs may be supported in any suitable manner as for instance by one wall of the chamber and a sheet metal wall 13 forming one side of the storage chamber 10. These sheet metal walls may be secured to vertical angle irons 14. The thin sheet metal walls 13 permit free heat transfer therethrough so that the storage chambers 10 can be kept cold by the brine in the troughs 11. The troughs are of such depth that the loaded containers 12 may freely float and the depth and dimensions are also so selected that there will be enough brine in the troughs to effect the freezing action.

One end wall of the chamber is provided with a series of inlet openings 15 opposite to the end of each trough and of such size that the containers may be pushed through the openings into the troughs. These openings may be closed by any suitable means, although to facilitate rapid filling, each closure may be in the form of a flexible canvas flap 16 secured above the opening and hanging down from it. These are sufficient to prevent escape of cold to any objectionable degree.

In the opposite end wall there are provided openings 17 opposite the end of each trough and out through which the containers may be taken. These likewise may have canvas flap closures 18 and preferably have supporting shelves 19 outside of the wall from which the workman may take the containers.

Each trough at its delivery end is preferably provided with an inclined bottom wall 20 leading up to the lower side of the outlet openings 17 so that the containers may slide up out of the trough, through the opening and onto the shelf 19. Thus it is not necessary for the workman to put his hands in through the opening 17 to lift the containers up out of the brine.

Preferably above each trough adjacent to the delivery end is a conveyor mechanism 21 which may be a belt or chain on a pair of pulleys or sprockets. This belt or chain has projections therefrom and the lower run is so disposed in respect to the trough that the projections will engage the containers and advance them up the inclined wall 20 and out through the outlet 17. It is not necessary that this conveyor extend along the trough for a distance very much greater than the width of one container.

I have not illustrated any mechanism for driving the conveyors as it will be evident that they may be coupled to any source of power.

The speed of the conveyors should be comparatively slow and the operation of the conveyors may be either continuous or intermittent depending upon the length of the trough, the temperature of the brine, and the extent of the freezing action so as to insure that the containers stay in the brine for the desired length of time.

The brine may be delivered to either end of the troughs. If admitted at the end of the trough from which the containers are taken out, the brine will flow countercurrent to the containers and it will be necessary to manually or otherwise push the series of containers against the flow to permit admission of other containers at the inlet 15. If the brine be delivered to the end of the trough at which the containers are admitted, the current of the brine will carry the containers toward the outlet and up to the ejecting conveyor 21. As illustrated, the brine is delivered to the same end of the trough as that at which the containers are admitted. The brine flows from the brine cooler 22 through a conduit 23 and from the latter through branches into the several troughs. At the opposite end of the trough there is a conduit 24 having an overflow branch from each trough whereby the level of the brine in the trough is maintained constant. There may also be a second conduit 25 with branches connected to the bottom of each trough so that all of the brine may be drained out if desired. The brine withdrawn from the several troughs passes to a brine tank 26 and is then forced through the brine cooler again by a suitable pump 27.

Fish or other products which are in the containers, are subjected to the action of the brine in which the containers flow, and they are also cooled from above by the convection currents effected between superposed troughs which are constructed of heat conducting material so that they will be cooled by their direct contact with the brine. The air striking the bottom of each trough will be cooled and directed by convection to the containers of the lower tier where it will cool the contents thereof. To provide additional cooling for the containers in the top trough there is preferably a brine coil 28 above the top trough and supplied by the conduit 23. The brine from this coil may discharge into the conduit 24 or the conduit 25.

The storage chambers 10 are arranged between the tiers of troughs and are kept cold by the heat transfer through the sheet metal walls 13. They may also have cooling coils along the ceiling and supplied by the conduits 23, if desired.

The end wall having the outlets 17 is provided with a door 29 whereby the workman may take the containers of frozen product directly from the shelves or supports 19 and carry them into the storage chambers 10. To prevent escape of cold from these chambers there is preferably a vestibule 30 formed by a partition wall 31 with a door 32 opposite the door 29. In the storage chambers there may be provided any suitable form of racks for the containers, but these form no portion of my invention and have not been illustrated.

It will be noted that in my improved construction the containers are subjected to cooling action from both above and below and that the containers may be delivered to and taken from the apparatus without the necessity for workman entering the cold chamber. Of course, if the containers are to be taken into the storage chambers and stacked therein, it is necessary for the workman to enter these chambers, but here the temperature is not necessarily as cold as it is where the actual freezing takes place.

I do not wish to be limited to any particular size or dimension of the apparatus as this will depend upon the character of the material to be frozen, the temperature of the brine, the speed of circulation of the latter, and the extent to which the products are to be frozen. For fillet freezing I may make the chamber in the neighborhood of 100 feet long with the troughs 2 feet wide by 6 inches deep with the troughs spaced apart vertically on 18 inch centers. The workman may deliver to the eight troughs of each unit alternately. With the brine at −40° the containers may be in substantially continuous movement, and the material will be effectively frozen in transit.

Having thus described my invention what I claim as new and desire to secure by Letters Patent is:

1. An apparatus for freezing comestibles including a chamber having a series of superposed troughs extending lengthwise thereof, said chamber having inlet openings in one wall adjacent to one end of each trough and outlet openings in the opposite wall adjacent to the other end of each trough, each trough having a stationary inclined wall leading from below the liquid level upwardly to the corresponding outlet opening, and means for forcing containers from each trough along said inclined wall and through said outlet opening.

2. An apparatus for freezing comestibles including a chamber having a trough extending lengthwise thereof, means for circulating freezing liquid along said trough, and maintaining the level substantially constant, a stationary inclined wall at one end of the trough leading upwardly from below the liquid level in the trough to above said liquid level, and a conveyor for engaging the containers above the liquid level and conveying them up the inclined wall and from the chamber.

Signed at New York in the county of New York and State of New York this 7th day of February, A. D. 1929.

HENRY TORRANCE.